United States Patent [19]

Brothers et al.

[11] 4,035,162

[45] July 12, 1977

[54] FUSED ABRASIVE GRAINS CONSISTING ESSENTIALLY OF CORUNDUM, ZIRCONIA AND R₂O₃

[75] Inventors: Jack A. Brothers, Big Flats; Robert C. Doman, Painted Post; Robert N. McNally, Corning, all of N.Y.

[73] Assignee: Corning Glass Works, Corning, N.Y.

[21] Appl. No.: 627,902

[22] Filed: Nov. 3, 1975

Related U.S. Application Data

[63] Continuation of Ser. No. 414,425, Nov. 9, 1973, abandoned, which is a continuation-in-part of Ser. No. 168,782, Aug. 3, 1971, abandoned.

[51] Int. Cl.² .................. B24D 3/02; C09C 1/68; C08J 5/14
[52] U.S. Cl. .................. 51/298 A; 51/308; 51/309 A
[58] Field of Search .................. 51/298, 309, 308; 106/57

[56] References Cited

U.S. PATENT DOCUMENTS

| | | | |
|---|---|---|---|
| 2,279,260 | 4/1942 | Benner et al. | 51/309 |
| 2,297,546 | 9/1942 | Field | 106/57 |
| 2,418,496 | 4/1947 | Baumann et al. | 51/309 |
| 2,424,645 | 7/1947 | Baumann et al. | 51/309 |
| 2,768,887 | 10/1956 | Rosenberg et al. | 51/309 |
| 3,156,545 | 11/1964 | Kistler et al. | 51/309 |
| 3,181,939 | 5/1965 | Marshall et al. | 51/309 |
| 3,454,385 | 7/1969 | Amero | 51/309 |
| 3,519,448 | 7/1970 | Alper et al. | 106/57 |
| 3,891,408 | 6/1975 | Rowse | 51/309 |
| 3,893,826 | 7/1975 | Quinan et al. | 51/298 |

OTHER PUBLICATIONS

J. N. Brecker et al., NSF Hard Material Research vol. 1, 1972 Penn St. U. Materials Research Lab pp. 5-10, 30-49, 60-61 and 96-97.

H. F. G. Ueltz, "New Developments in Grinding," Carnegie Press 1972, pp. 1, 11-19, 28, 31-32, 40-46 and 50.

L. Coes, Jr., "Abrasives", Springer-Verlag, 1971, pp. 46-55 and 65-67.

*Primary Examiner*—Donald J. Arnold
*Attorney, Agent, or Firm*—Richard N. Wardell; Clarence R. Patty, Jr.

[57] ABSTRACT

Fused abrasive grain consists essentially of: (1) crystalline phases of corundum and zirconia, with an average crystallite size smaller than 300 microns and at least in part being an eutectic matrix and (2) analytically by weight, about 44 to 91% (preferably 44 to 80%) $Al_2O_3$, about 5 to 50% (preferably 17.6 to 50%) $ZrO_2$ to 0.1 to 12% (preferably 0.2 to 5%) $R_2O_3$ wherein R is at least one metal selected from vanadium, chromium, manganese and cobalt, the percentage of $R_2O_3$ is based on all R metal content calculated as $R_2O_3$, and the balance, if any, being incidental impurities not exceeding 2%. The R metal content is present as oxide in solid solution within the corundum, as random particles of aluminate phase and/or as small particles of the R metal scattered throughout the grain, depending upon the relative oxidizing-reducing ambient conditions during melting. Melted raw material is formed, directly or indirectly, into grain of appropriate particle sizes for use in abrasive articles such as grinding wheels, coated abrasive products and the like.

16 Claims, No Drawings

FUSED ABRASIVE GRAINS CONSISTING ESSENTIALLY OF CORUNDUM, ZIRCONIA AND R₂O₃

CROSS-REFERENCE TO RELATED APPLICATION

This is a continuation of application Ser. No. 414,425, filed Nov. 9, 1973, which in turn is a continuation-in-part of application Ser. No. 168,782, filed Aug. 3, 1971 both now abandoned.

BACKGROUND OF THE INVENTION

A major focus in the abrasives industry today is the development of more efficient abrasive grain having longer lifespan for heavy duty snag grinding (also called "snagging") of ingots and castings of metal (e.g. stainless steels).

As known to us, the presently best abrasive grains (i.e., particulate abrasive material) that are commercially available for heavy duty snag grinding consist of a fused mixture of alumina and zirconia, both of high purity quality. The two most common compositions of these commercial abrasives appear to have approximate $Al_2O_3:ZrO_2$ weight ratios of 3:2 and 3:1. The development of the fused alumina-zirconia grain overcame such deficiencies in prior abrasive grains as the relatively high rates of chipping due to brittleness of fused alumina grain and the relatively high rates of attritious wear due to abrasive softness of zirconia grain.

Despite the above-noted improvements, there still has remained a strong desire of users of the abrasive grains for even further improvements that will afford them significant economic advantage.

While it has been proposed to improve sintered aluminazirconia abrasive grains by including small additions of other oxides (e.g. manganese dioxide) as sintering aids therein, nevertheless the resultant modified sintered grains have been found to exhibit abrasive wear characteristics grossly inferior to those of fused alumina-zirconia abrasive grains. Moreover, sintering aids are inapplicable to the latter grains in view of their fused nature.

SUMMARY OF THE INVENTION

We have now discovered an abrasive grain that has substantially lesser tendency for chipping (or probability of fracture) and substantially lesser rates of attritious wear than the fused alumina-zirconia abrasives. These results were found by making fused mixtures of alumina, zirconia and at least one oxide of metal selected from vanadium, chromium, manganese and cobalt. While oxides of these metals have a tendency to form solid solutions with the corundum phase of the abrasive grain, our experiments indicate that it is not necessary for all of these metal oxides to be in such solid solution to provide the improved abrasive grain of our present invention. Depending upon the relative oxidation-reduction ambient environment during fusing of the material, the resultant fused abrasive may contain dispersed particles of metal (or alloy) corresponding to the metals of the oxides, aluminates of such metal oxide combined with alumina, and/or the noted solid solution. In all these various situations, the resultant grain is found to be of the improved character indicated herein.

Broadly stated, our invention is a fused abrasive grain consisting essentially of:

a. the crystalline phases of corundum and zirconia, and b. analytically by weight, about 44 to 91% (preferably 44 to 80%) $Al_2O_3$, about 5 to 50% (preferably 17.6 to 50%) $ZrO_2$ and 0.1 to 12% (preferably 0.2 to 5%) $R_2O_3$ wherein R is at least one metal selected from vanadium, chromium, manganese and cobalt, and the percentage of $R_2O_3$ constitutes the entire R metal content calculated as $R_2O_3$. As noted in the previous paragraph, this abrasive grain may also contain one additional crystalline phase or two additional crystalline phases, viz. random particles of aluminate phase and/or small particles of the R metal scattered or randomly dispersed throughout the grain among the other crystalline phases, which are mainly corundum and zirconia.

Although our present preference is to employ oxide of either chromium (0.2–3%) or manganese (0.5–5%) as the $R_2O_3$ in the abrasive grain of this invention, substantially similar improved grain (in terms of probability of fracture and attritious wear) can be attained by selecting any of the other metal oxides or combinations thereof in reasonably high purity forms or in forms of substances that decompose during heating or fusion to yield such oxide and oxides. For example, it may be commercially advantageous to use metallurgical or other good grades of chromite (chrome ore) so as to provide (analytically) $Cr_2O_3$. Incidental impurities derived from raw materials or other sources should not exceed about 2 wt. % of the entire grain composition.

Production of the new grain is accomplished by conventional techniques well known in the art for manufacturing fused abrasives. The electrodes of electric arc melting furnaces are suitably adjusted during melting to either establish a "kissing arc" (i.e., lower tip of electrodes essentially just about touching surface of the melt) or be submerged for mainly resistance heating via current passing through the melt. If it is desired to have a more oxidized melt and grain (i.e., no free metal particles therein), the reduced condition thereof caused by the common carbon or graphite electrodes can be simply reversed by the known practice (see U.S. Pat. No. 960,712) of lancing the melt with oxidizing gas just prior to pouring of the melt. Solidification of a melt is accomplished in a reasonably rapid manner, according to the well known procedures (e.g. by pouring into molds of graphite or cast iron to form slabs or "pancake" castings or by pouring onto a plurality of discrete packed cooling media), so as to produce the uniform and very fine crystallization characteristic of the best quality fused abrasive grain. Generally, the crystals are smaller than 300 microns, and the optimum average crystallite size in the fused grain is commonly about 40–60 microns. The solidified product is crushed as desired by conventional procedures. Common grain mesh or grit sizes range from about less than 6 to 250 mesh (U.S. Standard Sieve), depending upon the type of abrasive article in which the abrasive grains are to be employed. For heavy-duty grinding wheels, sizes between 8 and 28 mesh are usually employed. The finer sizes are mainly used in finishing wheels and coated abrasive articles.

Our invention includes abrasive articles comprising a coacting combination of our above-described fused abrasive grain and bonding material. The bonding material to be employed is that material selected from among the many materials which are known or will be recognized as suitable for making any given type of article. In other words, there is no particular critical bonding material for our abrasive grain in the present invention. Suitable bonding materials can range from organic to inorganic bonding agents as the circumstances dictate according to principles known in this art. While bonds like Sorel cement (magnesium oxychloride), sodium silicate cement or metallic bonds may be used in making certain articles of our abrasive grain, the more common organic polymer or vitrified silicate bonding agents are preferred, especially for heavy-duty grinding wheels. The organic polymer bond is ordinarily preferably over even the best alkali metal-containing vitrified silicate bonds. Among the many organic polymer bonds are phenolic resins (phenol aldehydes with or without modifying additions of epoxy or vinyl resins), creosol aldehyde resins, resorcinol aldehyde resins, urea aldehyde resins, melamine aldehyde resins, aniline aldehyde resins, epoxy resins, alkyd resins, polyurethane resins, polyester resins, polyether resins, furfuryl alcohol resins, vulcanized natural rubber, butadiene-acrylonitrile copolymers, butadiene-styrene copolymers, shellac, varnish and the like. The most common suitable type is the phenol formaldehyde resin.

The organic bonding material usually includes additives, as is well known in the art, of fillers, modifiers, cross-linking agents and the like. Common fillers are metal sulfides, cryolite, potassium fluoroborate, potassium sulfate, soda ash, table salt, carbon black and the like. Lime is also commonly added.

In making bonded abrasive articles or grinding wheels, about 40 to 64 vol. % of them is abrasive grain, about 10 to 60 vol. % is the total bonding material (including additives) and the balance is porosity. Fillers are usually about 8–30 vol. % of the total bonding material and lime is usually 1–8 vol. % of the same. Initially, the abrasive grain is wet with a solvent, wetting agent and/or liquid resin. Then it is mixed with the bonding materials and the mixture is pressed (usually also heated) to shape. In the case of the more common thermosetting bonds, the article is cured by heating to harden or set the resin bond.

Coated abrasive articles can also be advantageously made with the improved abrasive grain. Conventional flexible backing of paper or cloth sized with common adhesives (e.g. hide glue mixed with calcium carbonate and water) is coated on one side with the abrasive grain contacting a wet adhesive making coat, which then dried. A final sizing coat is usually applied on top of the abrasive making coat as is known in the art.

DESCRIPTION OF THE PREFERRED EMBODIMENTS

EXAMPLE 1.

Four samples of fused grain were prepared with amounts of chromic oxide varying zero to 1.8 wt. % of the fused material. The typical analyses of the raw materials employed were (in weight percent):

Alumina: 99.33% $Al_2O_3$, 0.51% $Na_2O$, 0.02% $SiO_2$, 0.02% $Fe_2O_3$;

Fused zirconia: 98.68% $ZrO_2$ (including residual $HfO_2$), 0.20% $SiO_2$, 0.08% $Fe_2O_3$, 0.62% $Al_2O_3$, 0.34% $TiO_2$;

Chromic oxide: 99% $Cr_2O_3$. Batch mixtures of these raw materials for the four samples were as follows (in pounds):

| Sample No. | Alumina | Zirconia | Chromic Oxide |
|---|---|---|---|
| 1 | 75 | 50 | — |
| 2 | 74.63 | 50 | 0.37 |
| 3 | 74.25 | 50 | 0.75 |
| 4 | 72.75 | 50 | 2.25 |

After each batch mixture was melted, the molten mass was cast into a graphite mold and solidified as a thin "pancake" pig or ingot of thickness varying from about 1 inch to 1 ½ inches. Then each pig was crushed and sieved to grains of sizes −8+10 mesh (U.S. Standard Sieves); which conformed to the abrasive grit size No. 10 standards of the American National Standards Institute (formerly United States of America Standards Institute) as set forth in the USAS standards bulletin B74.12-1968, Table 2. The average crystallite size of each sample was approximately 50 microns. The phase analyses of these four samples (as determined by conventional point counting) are as follows (in percent by volume);

| Sample No. | Primary Corundum | Primary Zirconia | Corundum-Zirconia Eutectic | Chromium Metal |
|---|---|---|---|---|
| 1 | 21.8 | 4.3 | 73.9 | — |
| 2 | 22.1 | 11.6 | 66.1 | 0.2 |
| 3 | 19.4 | 3.4 | 77.0 | 0.2 |
| 4 | 17.9 | 5.4 | 76.5 | 0.2 |

The microstructural appearance in each case was of primary corundum crystals and occasional primary zirconia blebs in a matrix of eutectic. The latter three samples had finely disseminated chromium metal particles randomly throughout the matrix.

The calculated chemical analyses of the three main constituents and the actual chemical analyses of all chromium content as $Cr_2O_3$ are as follows (in percent by weight):

| Sample No. | $Al_2O_3$ | $ZrO_2$ | $Cr_2O_3$ (calc.) | $Cr_2O_3$ (actual) |
|---|---|---|---|---|
| 1 | 60 | 40 | — | — |
| 2 | 59.7 | 40 | 0.3 | 0.32 |
| 3 | 59.4 | 40 | 0.6 | 0.56 |
| 4 | 58.2 | 40 | 1.8 | N.D.* |

(*not determined)

Specimens of the grains of each sample described above were subjected to a plain fly milling test of a type now employed in the abrasives industry to evaluate abrasive grains. In that test, a grain specimen is mounted in a holder, by means of ceramic and/or epoxy resin cement, on the periphery of a 16 inch diameter fly wheel driven by a motor and having a horizontal axis of rotation. The grain specimen is mounted so as to have one of its points of apexes protruding radially outward from the wheel periphery. The radial distance between the wheel periphery and the cutting tip or point of the protruding apex of the grain specimen is measured so as to determine the diameter of the circular path travelled by such tip or point. A steel test plate (6 inch × 3 inch × ¾ inch) is fastened to a movable support which enables this plate to be fed or moved laterally underneath the fly-wheel. The plate is mounted in an inclined position of a rise of 0.00436 inch in 6 inches of plate length. The plate is fed toward the wheel in the axial direction of the wheel and with the lower (or forward) end of the plate passing under the wheel first. The initial vertical position of the plate vis a vis the wheel is established by turning the wheel so that the grain specimen is at the lowermost position, moving the forward end of the plate under the grain specimen to a position where, as the wheel is lowered, the cutting point of the grain specimen will scratch the plate surface at about 0.35 inch from its forward end. While slowly lowering the wheel, the wheel is oscillated by hand until it is felt that the grain tip has just slightly scratched the plate surface and the resultant fine scratch is just visible to the eye of the operator. With the grain positioned out of contact with the plate, the latter is moved laterally until its forward end is just beyond the point of being underneath the path travelled by the grain cutting tip. Next, the motor-driven wheel is rotated at a peripheral speed of 12,500 sfpm. Then the plate is fed or passed laterally toward the wheel at a speed such that the rotating grain tip (in the absence of any chipping) will make a series or row of 110 successive and progressively deeper cuts in the top surface of the plate with these spaced 0.0545 inch apart along the 6 inch length of the plate. In the same manner, four additional series of cuts are made on the same plate with the same grain specimen as in the first series of cuts. In all five series of cuts, measurements are made of the length of a cut and its distance from the forward end of the plate with respect to each of the first and last cuts of each series and the cut immediately before and after the cut or cuts during which chipping occurred (as is observable on the plate). In one selected series, additional measurements of the same type are made with respect to each of five cuts located nearest to a whole number of inch or inches from the forward end of the plate along the length of such series.

With the aid of a programmed computer, the depth of cuts and the probability of fracture and attritious wear rate for each sample are calculated from the above-described measurements. Since the measurement of the length of a cut is more convenient than measurement of the depth of a cut, the programmed computer is utilized to calculate depth of a cut in accordance with the known relationship:

$$l = 2\sqrt{Dt}$$

where l is the length of the cut, D is the diameter of the circular path travelled by the grain cutting tip and t is the depth of the cut.

Probability of fracture ($P_c$) indicates the relative impact resistance or resistance to chipping of abrasive grain under nominal grinding conditions. In computing probability of fracture, the computer first determines for each fracture cut (i.e., cut during which fracture occurred) found in the five series of cuts the depth of that cut in the absence of the fracture. This is done by adding 0.00436/110 inch to the calculated depth of the cut immediately preceding the fracture cut. The total number of these fracture cuts with calculated depths in the range of 2.616 to 3.924 × $10^{-3}$ inch (earlier characterized as 2.84 to 3.71 × $10^{-3}$, which limits are the midpoints of specific data segments of a series where each segment includes all data substantially ±0.22 × $10^{-3}$ inch from its midpoint) is determined for all five series on all plates cut by the specimens and stored for a subsequent computation. Next, determination is made of the rate of cut depth increase per cut (which is less than the ideal rate based on the absence of any attritious wear) that occurred over the consecutive cuts from the first cut in a series or the cut immediately following a fracture cut (hereafter designated "first cut") to the first or next fracture cut or the last cut in the series (hereafter designated "last cut"), respectively. In each case, the calculated depth of the "first cut" is subtracted from the calculated depth of the "last cut" to obtain the change in depth with attritious wear assumed to be at a linear rate therebetween. Then the difference between the distances of the "first cut" and the "last cut" from the forward plate end is determined, which is the distance between the "first cut" and the "last cut." The latter difference is multiplied by the factor of 110 cuts ÷ 6 inches to obtain the number of cuts from the "first cut" to the "last cut". The latter product is divided into the preceding change in depth value to yield the desired rate of cut depth increase per cut. Next, the total number of possible successful cuts with calculated depths in the range of 2.616 to 3.924 × $10^{-3}$ inch which precede and include every "last cut" is determined in four groups of computations. In the first group, for each "last cut" with a calculated depth of 0.003924 inch or greater, the related computed rate of cut depth increase per cut is divided into 0.000436 inch and the resultant dividend is multiplied by 3. In the second group, for each "last cut" with a calculated depth less than 0.003924 inch but at least equal to 0.003488 inch, the related rate of cut depth increase per cut is divided into 0.000436 inch and the resultant dividend is multiplied by 2. Then the difference (if any) between the "last cut" calculated depth and 0.003488 inch is divided by the related rate of cut depth increase per cut. In the third group, for each "last cut" with a calculated depth less than 0.003488 inch but at least equal to 0.003052 inch, the related rate of cut depth increase per cut is divided into 0.000436 inch. Then the difference (if any) between the "last cut" calculated depth and 0.003052 inch is divided by the related rate of cut depth increase per cut. In the fourth group, for each "last cut" with a calculated depth less than 0.003052 but at least equal to 0.002616 inch, the difference (if any) between the "last cut" calculated depth and 0.002616 inch is divided by the related rate of cut depth increase per cut. The total sum of all calculated values from the preceding four groups of computations covering all five series of cuts on all test plates is the desired total number of possible successful cuts. Upon dividing this latter sum into the previously stored total number of fracture cuts, the resultant dividend is than multiplied by 100 to yield the percentage value of probability of fracture of a sample.

The attritious wear rate ($\Delta t_a$) takes into account only wear debris smaller than one micron (i.e., excludes chipping, which is larger size pieces that break off the grain specimen). This rate is computed only for the one selected series of cuts as previously noted. Utilizing the measurements of the first cut of the series and the cut nearest one inch from the forward plate end, the computer determines a linear attritious wear rate (assumed to be linear) between those two cuts. Assuming the same linear rate prior to the first cut, the computer then determines the location of "zero cut depth" on the top surface of the plate (or on an imaginary extension thereof beyond the forward plate end if such is necessary due to inaccuracy in the intial positioning of the plate vis a vis the wheel). Such location of "zero cut depth" is a point just prior to the first point where the tip of the rotating grain specimen would almost imperceptibly cut the plate surface (or its imaginary extension) as it very slowly moves laterally under the wheel. Next, the computer determines the calculated depth of the theoretical ninety second cut at a location on the top surface of plate 5 inches from the "zero cut depth" point in the direction toward the rear plate end. To do this, the computer selects measurements of the actual cuts that immediately precede and follow such location of the theoretical ninety second cut. From those measurements, a linear attritious wear rate (assumed to be linear) is computed between those two cuts. From such combined data, the proportionally calculated value of depth of the theoretical ninety second cut is obtained. In the event that chipping has occurred in the selected series, then the computer determines from the other measurements of cuts before and after each fracture cut the total amount of cut depth lost by such chipping and adds that amount to the above-described calculated value of depth of the theoretical ninety second cut to provide a value of such depth compensated for chipping so as to be the value which would have been obtained in the absence of chipping. The depth of the theoretical ninety second cut is likewise calculated for a selected series of cuts on each of the other test plates cut by specimens of the same sample. These resultant cut depth values are added together and divided by the total number of such values to obtain the arithmetic mean of the calculated values of depth of the theoretical ninety second cuts for specimens of a given sample. Such arithmetic means is then subtracted from the theoretical depth of cut for the theoretical ninety second cut, which theoretical depth of cut is that depth which would have occurred if no wear occured on the grain specimens. The resultant difference is the mean value of total calculated wear of the grain specimens after having made 92 cuts (real plus imaginary). The attritious wear rate in inch per cut is then computed by dividing that mean value of total calculated wear by 92.

The plain fly milling test results of the above four samples, based upon 25 specimens of such sample tested on plates of AISI 1117 steel of Rockwell hardness $R_B$ 80, are as follows:

| Sample No. | Fractures | Cuts | $P_c$ (%) | $\Delta t_a$ (inch/cut) |
|---|---|---|---|---|
| 1 | 22 | 1995 | 1.10 | $5.87 \times 10^{-6}$ |
| 2 | 15 | 2858 | 0.53 | $3.70 \times 10^{-6}$ |
| 3 | 10 | 1899 | 0.53 | $6.09 \times 10^{-6}$ |
| 4 | 10 | 2086 | 0.48 | $6.41 \times 10^{-6}$ |

EXAMPLE 2.

Three samples of fused grain were prepared with amounts of chromic oxide varying from zero to 0.75 wt. % of the fused material using the same raw materials as in EXAMPLE 1. The batch mixtures were as follows (in pounds):

| Sample No. | Alumina | Zirconia | Chromic Oxide |
|---|---|---|---|
| 5 | 93.75 | 31.25 | — |
| 6 | 93.27 | 31.25 | 0.48 |
| 7 | 92.81 | 31.25 | 0.94 |

Each melted mixture was cast into a graphite to form the "pancake" pig or ingot, which was crushed to <8+10 mesh grain. The phase analyses are as follows (in volume percent):

| Sample No. | Primary Corundum | Primary Zirconia | Corundum-Zirconia Eutectic | Chromium Metal |
|---|---|---|---|---|
| 5 | 58.0 | 7.3 | 34.7 | — |
| 6 | 58.2 | 4.1 | 37.6 | 0.1 |
| 7 | 56.9 | 6.8 | 36.1 | 0.2 |

The microstructural appearances and average crystallite sizes of each of these three samples were essentially the same as those of the samples in EXAMPLE 1.

The calculated chemical analyses of the three main constituents and the actual chemical analyses of all chromium content as $Cr_2O_3$ are as follows (in weight percent):

| Sample No. | $Al_2O_3$ | $ZrO_2$ | $Cr_2O_3$ (calc.) | $Cr_2O_3$ (actual) |
|---|---|---|---|---|
| 5 | 75 | 25 | — | — |
| 6 | 74.62 | 25 | 0.38 | 0.39 |
| 7 | 74.25 | 25 | 0.75 | 0.62 |

The plain fly milling test results of these three samples, based upon 25 specimens of each sample tested on plates of AISI 1117 steel of Rockwell hardness $R_B$ 80, are as follows:

| Sample No. | Fractures | Cuts | $P_c$ (%) | $\Delta t_a$ (inch/cut) |
|---|---|---|---|---|
| 5 | 16 | 2075 | 0.77 | $6.30 \times 10^{-6}$ |
| 6 | 8 | 2399 | 0.33 | $4.40 \times 10^{-6}$ |
| 7 | 5 | 2139 | 0.23 | $8.91 \times 10^{-6}$ |

EXAMPLE 3.

A sample No. 8 was prepared of the same batch mixture as Sample No. 2, but was melted by submerged electrode practice followed by a few minutes of oxygen lancing prior to casting (which contrasts with the simple "kissing arc" melting of Sample No. 2). The phase analysis of Sample No. 8 is as follows (in volume percent):

| Primary Corundum | Primary Zirconia | Corundum-Zirconia Eutectic | Chromium Metal |
|---|---|---|---|
| 24.0 | 11.1 | 64.9 | None |

Average crystallite size thereof is approximately 50 microns.

The calculated chemical analyses of the three main constituents and the actual chemical analysis of all chromium content as $Cr_2O_3$ in Sample No. 8 are as follows (in weight percent):

| $Al_2O_3$ | $ZrO_2$ | $Cr_2O_3$ (calc.) | $Cr_2O_3$ (actual) |
|---|---|---|---|
| 59.7 | 40 | 0.3 | 0.27 |

The plain fly milling test results of Sample No. 8, based upon 25 specimens of the sample tested on plates of AISI 1117 steel of Rockwell hardness $R_B$ 80, are as follows:

| Fractures | Cuts | $P_c$ (%) | $\Delta t_a$ (inch/cut) |
|---|---|---|---|
| 6 | 1805 | 0.33 | $4.24 \times 10^{-6}$ |

Measurements of Knoop hardness on the corundum crystals of samples with $Cr_2O_3$ and of samples without $Cr_2O_3$ in the batch show that the hardness of the corundum crystals in the samples made with $Cr_2O_3$ is lower than in such crystals in the sample made without $Cr_2O_3$.

EXAMPLE 4.

Similarly improved grain samples were prepared with batch mixtures including chromic oxide in varying amounts of up to about 9 wt. % and more. The only presently significant disadvantages of higher $Cr_2O_3$ amounts appear to be raw material cost and some difficulty in avoiding undesirable porosity in the pigs.

EXAMPLE 5.

Substantially equivalent improved grains are made by substituting (on an equal weight basis) other metal oxides for chromic oxide in the preceding examples, which other oxides in raw material form are vanadium pentoxide, manganese dioxide and cobaltic oxide.

Further exemplary illustration of our invention is given by the following three samples of fused grain prepared by induction melting the noted batch mixtures (in weight percent) of high purity raw materials in graphite crucibles, quenching the crucibles and their molten contents in water, crushing and milling the solidified mass, and then sieving such mass to recover −8+10 mesh (U.S. Standard) grains:

| Sample No. | $Al_2O_3$ | $ZrO_2$ | $MnO_2$ | Other |
|---|---|---|---|---|
| 9 | 47.0 | 47.0 | 4.0 | 2.0 (a) |
| 10 | 73.0 | 23.0 | 4.0 | — |
| 11 | 91.0 | 5.0 | 2.0 | 2.0 (b) |

NB:
(a) 2.0% $SiO_2$;
(b) 2.0% $TiO_2$

The purity and particle sizing of the raw materials employed were:

| Material | Purity (wt. %) | Particle Sizing | | |
|---|---|---|---|---|
| | | Nominal (wt. %/mesh) | 90 wt. % less than (microns) | Average (microns) |
| $Al_2O_3$ | 99.2 | 95.0% -325 | 20 | 5.8 |
| $ZrO_2$ | 99.0 | >99.0% -325 | 6 | 4.4 |
| $MnO_2$* | 99.9 | 95.8% -45 | — | — |
| | | (*about 89% -60 mesh and 21% -325 mesh) | | |
| $SiO_2$ | >99.0 | 95.0% -325 | 30 | 13 |
| $TiO_2$ | 99.9 | >99.0% -325 | 1.5 | 0.9 |

The plain fly milling test results of the above three samples, based upon 25 specimens of each sample tested on plates of AISI 1018 steel of Rockwell hardness $R_c$ 33, are as follows:

| Sample No. | $P_c$ (%) | $\Delta t_a$ (inch/cut) |
|---|---|---|
| 9 | 0 | $0.92 \times 10^{-6}$ |
| 10 | 0.12 | $4.06 \times 10^{-6}$ |
| 11 | 0.33 | $6.72 \times 10^{-6}$ |

For exemplary comparison purposes, two sets of sintered abrasive grain samples were made from batch mixtures corresponding to those described above (viz. samples 9A and 9B correspond to sample 9, sample 10A corresponds to sample 10, and samples 11A and 11B correspond to sample 11), except that a $MnO_2$ of 99.7 wt. % purity was used in samples 9B and 11B after such ingredient was reduced in particle sizing such that 90 wt. % was less than 2 microns and the average particle size was 1.3 microns.

In the first set of sintered grain samples, each batch mixture in a proportion of 93 parts by weight was blended with 7 parts by weight of a binder solution composed of about 10 wt. % of a common polyethylene glycol binder (viz. Carbowax 20,000) dissolved in 90 wt. % water. This moist mixture was pressed through a 25 mesh (U.S. Standard) screen to achieve further mixing. The water was evaporated from the mixture to leave a granulated batch, which was then pressed at 10,000 psi. into discs measuring 1 ⅛ inches diameter by about ¼ inch thick. These discs were then fired at an approximate average rate of 150°–200° C./hr. up to and at temperatures and for hold times at such temperatures as follows:

| Sample: | 9A | 10A | 11A |
|---|---|---|---|
| Temperature (° C.): | 1450 | 1400 | 1340 |
| Hold Time (hrs.): | 4 | 4 | 4 |

The fired discs were then crushed and sieved to recover −8+10 mesh (U.S. Standard) sintered grains. Specimens of each sample (25 of 9A, but only 4 or 5 of 10A and 11A because such number is sufficient to insure ascertainment of typical attritious wear and high attritious wear was such that cuts were never made in range where data for probability of fracture is measured thereby rendering the larger number of specimens needed for such data unnecessary) were subjected to the plain fly milling test on AISI 1018 steel of Rockwell hardness $R_c$ 33 and the results are as follows:

| Sample No. | $P_c$ (%) | $\Delta t_a$ (inch/cut) |
|---|---|---|
| 9A | 0.24 | $19.45 \times 10^{-6}$ |
| 10A | — | $40.42 \times 10^{-6}$ |
| 11A | — | $39.94 \times 10^{-6}$ |

In the second set of sintered grain samples, each batch mixture was dispersed in an equal weight portion of water and ball milled for 24 hours and then dried on a hot plate for about 20 minutes to yield a cake of low moisture content. Approximately 3 wt. % of a common polyethylene glycol binder (viz. Carbowax 20,000), in the form of a water solution thereof was blended into the mass of powdered cake and the resultant mass was then fabricated into discs as described above with respect to the first set of sintered samples. These discs of the second set were then fired at an approximate average rate of 150°–200° C/hr. up to and at temperatures and for hold times at such temperatures as follows:

| Sample: | 9B | 11B |
|---|---|---|
| Temperature (° C.): | 1450 | 1340 |
| Hold Time (hrs.): | 4 | 4 |

The fired discs were then crushed and sieved to recover −8+10 mesh (U.S. Standard) sintered grains. Specimens of each sample (20 of 9B and only 5 of 11B for same reason as noted concerning 10A and 11A) were subjected to the plain fly milling test on AISI 1018 steel of Rockwell hardness $R_c$ 33 and the results are as follows:

| Sample No. | $P_c$ (%) | $\Delta t_a$ (inch/cut) |
|---|---|---|
| 9B | 0.12 | $19.00 \times 10^{-6}$ |
| 11B | — | $30.83 \times 10^{-6}$ |

EXAMPLE 6.

A grinding wheel for snagging is made from the following mixture (in weight percent):

Abrasive grain of Sample No. 6 . . . 79 (reduced to −10+16 mesh)
Phenol-formaldehyde resin . . . 8
$FeS_2$ . . . 6
Cryolite . . . 6
CaO . . . 1.

The grain is wet with furfural in an amount of about 55 cc. of furfural per kilogram of resin. Then the wet grain is thoroughly mixed with the other ingredients, molded in a hot press at about 325° F. for 1 hour and then cured at 350° F.

EXAMPLE 7.

A coated abrasive product is made by applying to a suitably prepared drills cloth backing a thin coating of sizing adhesive consisting of (by wt.) about 25 parts of 86 millipoise hide glue, about 25 parts of finely divided $CaCO_3$ and about 49 parts of water to give a coating thickness, in dried sizing adhesive weight, of about two pounds per coated ream. Then a making coat consisting of (by wt.) about 30 parts of the same hide glue, about 30 parts of the $CaCO_3$ and about 39 parts of water (all mixed and brought to a temperature of about 70° C.) is applied and abrasive grain of Sample No. 2 (reduced to 24 mesh) is applied to the wet making coat in an amount equivalent to about 46 pounds per coated ream. This combination is then dried. A final sizing coat (in parts by wt.) of 32 parts of phenol-formaldehyde resin, 54 parts of $CaCO_3$ and 14 parts of water (all mixed and at about 38° C.) is applied and then cured to set the phenolic resin.

We claim:
1. A fused abrasive grain consisting essentially of
  a. the crystalline phases of corundum and zirconia with an average crystallite size smaller than 300 microns and at least in part being an eutectic matrix, and
  b. analytically by weight, about 44 to 91% $Al_2O_3$, about 5 to 50% $ZrO_2$, 0.1 to 12% $R_2O_3$ wherein R is at least one metal selected from vanadium, chromium, manganese and cobalt, the percentage of $R_2O_3$ is based on all R metal content calculated as $R_2O_3$, and the balance, if any, being incidental impurities not exceeding 2%.
2. The abrasive grain of claim 1 wherein, analytically by weight, $Al_2O_3$ does not exceed about 80% and $ZrO_2$ is at least about 17.6%.
3. The abrasive grain of claim 2 wherein, analytically by weight, $R_2O_3$ does not exceed about 5%.
4. The brasive grain of claim 1 wherein the crystalline corundum phase contains $R_2O_3$ in solid solution therein.
5. The abrasive grain of claim 1 further containing at least one additional crystalline phase selected from: (a) R metal in the form of randomly scattered particles among the crystalline phases of corundum and zirconia, and (b) an aluminate containing R metal in the form of random particles among the crystalline phases of corundum and zirconia.
6. The abrasive grain of claim 1 wherein the selected R metal is chromium.
7. The abrasive grain of claim 6 wherein, analytically by weight, the $Cr_2O_3$ is 0.2 to 3%.
8. The abrasive grain of claim 5 wherein, analytically by weight, the $Al_2O_3$ is about 63 to 75% and the $ZrO_2$ is about 24 to 35%.
9. The abrasive grain of claim 1 wherein the selected R metal is manganese.
10. The abrasive grain of claim 9 wherein, analytically by weight, the oxide of manganese considered as $Mn_2O_3$ is 0.5 to 5%.
11. An abrasive article comprising a coacting combination of abrasive grain and bonding material therefor, said abrasive grain being the fused abrasive grain of claim 1, and said bonding material being selected from organic polymer and inorganic bonding agents.
12. A grinding wheel comprising a coacting combination of abrasive grain and bonding material therefor, said abrasive grain being the fused abrasive grain of claim 1, and said bonding material being selected from organic polymer and vitrified silicate bonding agents.
13. A grinding wheel comprising a coacting combination of abrasive grain and bonding material therefor, said abrasive grain being the fused abrasive grain of claim 8, and said bonding material being an organic resin bonding agent.
14. A coated abrasive article comprising a coacting combination of a flexible backing and abrasive grain attached thereto by an adhesive, said abrasive grain being the fused abrasive grain of claim 1.
15. The abrasive grain of claim 7 wherein, analytically by weight, $Al_2O_3$ does not exceed about 80% and $ZrO_2$ is at least about 17.6%.
16. The abrasive grain of claim 10 wherein, analytically by weight, $Al_2O_3$ does not exceed about 80% and $ZrO_2$ is at least about 17.6%.

* * * * *

UNITED STATES PATENT AND TRADEMARK OFFICE
CERTIFICATE OF CORRECTION

PATENT NO. : 4,035,162
DATED : July 12, 1977
INVENTOR(S) : Jack A. Brothers, Robert C. Doman, Robert N. McNally It is certified that error appears in the above-identified patent and that said Letters Patent are hereby corrected as shown below:

Column 1, line 36, after alumina insert -- - -- .

Column 4, line 12, change "]" to -- 1/4 -- .

Column 8, line 1, change "<" to -- - -- .

Column 12, line 23, change "5" to -- 15 -- .

Signed and Sealed this

First Day of November 1977

[SEAL]

Attest:

RUTH C. MASON
Attesting Officer

LUTRELLE F. PARKER
Acting Commissioner of Patents and Trademarks